(12) United States Patent
Farthofer et al.

(10) Patent No.: US 9,231,773 B2
(45) Date of Patent: Jan. 5, 2016

(54) HANDLING TIME INFORMATION IN COMMUNICATIONS SYSTEMS

(75) Inventors: Martin Farthofer, Vienna (AT); Gerald Goermer, Wandlitz (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 13/188,921

(22) Filed: Jul. 22, 2011

(65) Prior Publication Data
US 2013/0024557 A1    Jan. 24, 2013

(51) Int. Cl.
*G06F 15/173* (2006.01)
*H04L 12/14* (2006.01)
*H04M 15/00* (2006.01)

(52) U.S. Cl.
CPC ........ *H04L 12/1403* (2013.01); *H04L 12/1425* (2013.01); *H04L 12/1439* (2013.01); *H04L 12/1485* (2013.01); *H04M 15/41* (2013.01); *H04M 15/43* (2013.01); *H04M 15/57* (2013.01); *H04M 15/62* (2013.01); *H04M 15/63* (2013.01); *H04M 15/64* (2013.01); *H04M 15/65* (2013.01)

(58) Field of Classification Search
CPC ............ H04L 12/1403; H04L 12/1438; H04L 12/1485; H04L 65/4084; H04M 15/65
See application file for complete search history.

(56) References Cited

U.S. PATENT DOCUMENTS

| | | | |
|---|---|---|---|
| 6,950,403 B2 * | 9/2005 | Hopkins | 370/252 |
| 8,243,734 B1 * | 8/2012 | Deters et al. | 370/392 |
| 2006/0252438 A1 * | 11/2006 | Ansamaa et al. | 455/503 |
| 2008/0159499 A1 * | 7/2008 | Cai | 379/114.01 |
| 2009/0055487 A1 | 2/2009 | Moraes et al. | |
| 2010/0275248 A1 * | 10/2010 | Li | 726/4 |
| 2013/0019020 A1 * | 1/2013 | Kang et al. | 709/227 |
| 2013/0100863 A1 * | 4/2013 | Guerra et al. | 370/259 |

FOREIGN PATENT DOCUMENTS

WO    2011/162644 A1    12/2011

OTHER PUBLICATIONS

International Search Report application No. PCT/EP2012/063927 dated Oct. 1, 2012.
3GPP TS 23.203V9.3.0, "3rd Generation Partnership Project; Technical Specification Group Services and System Aspects; Policy and Charging Control Architecture (Release 9)", Dec. 2009, 123 pages.
3GPP TS 24.229 V9.2.0, "3rd Generation Partnership Project; Technical Specification Group Core Network and Terminals; IP Multimedia Call Control Protocol Based on Session Initiation Protocol (SDP); Stage 3 (Release 9)", Dec. 2009, 640 pages.

(Continued)

*Primary Examiner* — Joshua Joo
*Assistant Examiner* — Younes Naji
(74) *Attorney, Agent, or Firm* — Squire Patton Boggs (US) LLP (57) ABSTRACT

A method of handling time information in a communications system (100) comprising: receiving a message at a proxy entity such as a P-CSCF (110, 112, 114) in an IP Multimedia Subsystem (IMS) core network (108); determining a time zone offset between a local time of a terminal and a core network time; providing the time zone offset to a network element (116) in the core network; and generating a time stamp in the network element adjusted to correspond to the local time.

12 Claims, 1 Drawing Sheet

(56) References Cited

OTHER PUBLICATIONS

3GPP TS 32.240 V9.0.0, "3rd Generation Partnership Project; Technical Specification Group Services and System Aspects; Telecommunication Management; Charging Management; Charging Architecture and Principles (Release 9)", Dec. 2009, 44 pages.

3GPP TS 32.250 V9.0.0, "3rd Generation Partnership Project; Technical Specification Group Service and System Aspects; Telecommunication Management; Charging Management; Circuit Switched (CS) Domain Charging (Release 9)", Dec. 2009, 103 pages.

3GPP TS 32.298 V9.2.0, "3rd Generation Partnership Project; Technical Specification Group Service and System Aspects; Telecommunication Management; Charging management; Charging Data Record (CDR) parameter Description (Release 9)", Dec. 2009, 135 pages.

M. Garcia-Martin et al., "Private Header (P-Header) Extensions to the Session Initiation Protocol (SIP) for the 3rd-Generation Partnership Project (3GPP)", Network Working Group, Request for Comments: 3455, Jan. 2003, 32 pages.

3GPP TSG-SA5 (Telecom Management), SA5#74-CH, "DRAFT LS on Network Provided MS Time Zone Information for IMS Charging", S5-102889, Nov. 8-10, 2010, 1 page.

Office Action dated Aug. 28, 2015, issued in related U.S. Appl. No. 14/233,492.

* cited by examiner

HANDLING TIME INFORMATION IN COMMUNICATIONS SYSTEMS

This invention relates to handling of time information in communications systems. It is particularly, but not exclusively, related to handling of time information in communications systems which incorporate the IP Multimedia Subsystem (IMS).

IMS is an architectural framework for delivering Internet Protocol (IP) multimedia services. It was originally designed for evolving mobile networks. It has been further developed to support fixed networks. As such, it is capable of providing telecommunications services to different access networks such as GPRS, UMTS and WLAN over standardised interfaces. Examples of services provided by IMS include presence-based services, instant messaging, audio and video streaming, voice-related services, conferencing, and gaming. In addition to subscriber-based services, other services such as Lawful Intercept (LI) may be provided.

For many of these services, IMS offers the opportunity to perform Offline and Online Charging. In both offline and online charging, charging information is collected in real time, along with resource usage, and then debiting occurs. In online charging debiting of credit in respect of the resource usage occurs during its use. In offline charging, the charging information is passed over to a billing domain which can debit in respect of the resource usage after its use.

For both functions, that is charging and LI, it is important for the IMS to be provided with correct time information. In the case of tariff switching, that is when a low rate switches to a high rate, or vice versa, at a particular time of day, correct charging requires correct time information, for example when usage of a service starts and ends. In the case of LI, it is also important to obtain correct time information.

Therefore, for charging, it is useful to know, in real time, the correct time zone in which a user is located. This is especially the case for online charging, when an appropriate tariff is defined before service delivery, and so spending time in post-processing to establish correct time information is undesirable. It is necessary that the information is available in real time, and not at some later time. The existing standardised way for correlation is by using an IMS Charging ID (ICID) used for correlation of intra IMS and inter IMS-GPRS/UMTS charging information which is specified in 3GPP (Third Generation Partnership Project) TS (Technical Standard) 32.240 Charging Architecture and 3GPP TS 23.203 PCC Architecture. It is assumed that IMS networks provide the correct time when IMS services are used.

In the IMS, time information is available in several IMS Charging Data Records (CDRs) and in an Online Charging System (OCS).

In its current form, the IMS does not take account of a situation in which an IMS-based system serves a geographical area having a number of different time zones, for example a country where more than one time is used, such as the US, or if the IMS-based system is used for more than one country where different ones of these countries have different time zones. Therefore, at the moment, an IMS-based system runs according to its own time, an IMS core time (typically based on the time zone in which the majority of the IMS core network elements (NEs) are located), but if the user is located in a time zone different to the IMS core time zone, then the IMS core NEs are not aware of this time zone. For this reason, there can be situations in which it is not possible to apply a tariff switch at the right time, or to provide correct time stamps for LI. This may lead to inaccurate charging for the subscriber as well as causing problems for inter-operator billing.

According to a first aspect of the invention there is provided a method of handling time information in a communications system comprising:
receiving a message at a proxy entity in a core network;
determining a time zone offset between a local time and a core network time;
providing the time zone offset to a network element in the core network; and
generating a time stamp in the core network adjusted to correspond to the local time.

Preferably, the core network is an IMS. The core network may be a SIP core network. Preferably, the core network serves a number of access networks. The proxy entity may be a P-CSCF. It may be a CNGCF. The proxy entity may receive the message from an access network. The message may be a SIP message. It may be a request message, for example for service provision. It may be an initial service request.

The proxy function may serve terminals in a home, in a visited, and/or in a roaming network. It may be a proxy server. It may act as a proxy providing information about the network to terminals. The proxy function may be responsible for the provision of the service in a network. It may report on local conditions. These conditions may include access type, location, and time.

The proxy entity may also comprise a proxy functionality. The proxy entity may be capable of acting as a proxy with respect to the core network. It may be capable of controlling sessions.

The access network linked to the core network may be a mobile network. It may be a fixed network. The core network may be linked to both a mobile network and to a fixed network.

The core network may comprise a charging function. It may comprise an online charging function. It may comprise an offline charging function.

The time stamp may be used for non-charging purposes. It may be used for lawful interception.

The core network may operate according to a core network time. This may be arbitrary with respect to time zones containing terminals for which it is providing or arranging services. The terminals may be mobile terminals connecting wirelessly to an access network, or fixed terminals connecting to an access network via a wired connection.

Preferably, there is a plurality of proxy entities. Each proxy entity may be located in a respective time zone. Alternatively, there may be a common proxy entity serving a plurality of time zones. In this case, there may be a plurality of access networks with respective time zones. In the case in which there is a plurality of time zones, they may be arbitrary with respect to each other.

Preferably, network elements of the core network comprise a mapping table containing a mapping between the addresses of proxy entities linked to the core network and time zone offset information. The network elements may use the address or identifier of a proxy entity and corresponding time zone offset information to derive local time of a terminal or a network element. Daylight saving time may also be taken into account.

In one implementation of the invention, a proxy entity serves more than one time zone. In this case, the core network may provide services via a plurality of access networks. The access networks may be located in different time zones or in time zones which are arbitrary with respect to each other.

User-related time zone offset information may be provided from a relevant access network in which a terminal is located to the core network. This may be an implicit indication of the time zone offset information.

A relationship between a terminal and its corresponding time zone, that is the time zone of the access network, may be established. This relationship can be provided by an authentication and/or authorisation entity within the network which is responsible for allocating an IP address to terminals. The entity may be a server configured to allocate IP addresses to mobile terminals from within a specific, pre-defined, range of IP addresses. A specific IP address may be used to determine a corresponding IP address range and therefore, the time zone in which the mobile terminal is located. The proxy entity may be pre-configured with a mapping between IP address ranges and corresponding access networks. It may be configured with respective time zone offset information for each access network.

Time zone offset information may be generated in each proxy entity. It may be configured to be present in each proxy entity. When provision of a service is requested by a terminal, it may send a service request to a particular proxy entity. This may be proxy entity which has been assigned to the terminal or to a subscriber in a previously performed registration procedure.

The service request may have associated with it a header. The header may comprise a field configured to contain information relating to the request. The proxy entity may place time zone offset information into the header. It may place a time stamp in the header. Time zone offset information may be retrieved from the header by a network element and then be used by that network element or by an associated network element to generate a correct local time stamp. The correct time stamp may reflect the current time of a requesting terminal in its time zone. The network element may generate a time stamp indicating the start of service provision. A time stamp may be generated reflecting the end of service provision.

The service request may contain the IP address of a terminal. Once the core network has received the specific IP address, it can be used by a network element to adjust time stamps to reflect to the location of the terminal.

The proxy entity may relay a message, for example a request message, including a header field containing the time zone offset information to an entity of the core network which may be in a different time zone. In this way, the entity can receive the time zone offset information and use it to generate a correct local time. The message may contain a time stamp.

In one embodiment of the invention, the message has a P-Charging-Vector having a field specific for carrying time zone offset information. Alternatively a separate P-header for this message may be provided.

In the case of roaming between core networks, the time zone offset information may be provided by a visited core network to a home core network. This may enable offline and online charging, or other relevant activities, to be applied in the home core network. In this case, a visited IMS/P-CSCF may provide the time zone offset information to home core network network elements, such as an S-CSCF.

The proxy entity may be a gateway function. It may be a Customer Network Gateway Configuration Function (CNGCF). This may apply, for example in the case of the invention being applied to a TISPAN access network providing access to the core network. The gateway function may be provided with a mapping table containing IP address ranges, which it uses to determine time zone offset information. In this way, a relationship between a terminal and its corresponding time zone may be established. It can then provide this to whichever of the core network network elements are involved in providing a service to enable them to generate the correct local time for a device making a service request.

IP addresses for terminals may be provided by a configuration function, for example a Network Access Configuration Function (NACF).

The core network may provide services to a plurality of TISPAN access networks to which it is linked.

A time zone corrected time stamp may be sent to a billing functionality. It may be sent to an online charging functionality. Final correlation between an IP address range and a time zone may be done in a billing domain or an online charging domain.

According to a second aspect of the invention there is provided a communications system capable of handling time information in a communications system comprising:
a core network;
a proxy entity in the core network, the proxy entity being capable of receiving a message; and
a network element in the core network,
wherein the proxy entity is capable of determining a time zone offset between a local time and a core network time and capable of providing the time zone offset to the network element in the core network, the time zone offset being useable to generate a time stamp in the core network adjusted to correspond to the local time.

According to a third aspect of the invention there is provided a core network node for a communications system capable of handling time information in the communications system, the node being capable of receiving a message via an input; and wherein the node is capable of determining a time zone offset between a local time and a core network time and is capable of providing the time zone offset to a network element in a core network, the time zone offset being useable to generate a time stamp in the core network adjusted to correspond to the local time.

The input may be linked to an access network. The core network node may be capable of providing the time zone offset via an output to the network element in the core network. The output may be linked to a registrar server and/or to a redirect server. The core network node may comprise a processor which determines the time zone offset.

According to a fourth aspect of the invention there is provided a computer program product comprising software code that when executed on a computing system performs a method of handling time information in a communications system, the method comprising the steps of:
receiving a message at a proxy entity in a core network;
determining a time zone offset between a local time and a core network time;
providing the time zone offset to a network element in the core network; and
generating a time stamp in the core network adjusted to correspond to the local time.

Preferably, the computer program product has executable code portions which are capable of carrying out the steps of the method.

Preferably, the computer program product is stored on a computer-readable medium. It may be stored in non-transitory form.

An embodiment of the invention will now be described, by way of example only, with reference to the accompanying drawings in which.

In IP Multimedia Subsystem (IMS) networks, a central component for signalling and control is referred to as the Call Session Control Function (CSCF). Subdivided into three separate parts, the CSCF is responsible for all signalling via the Session Initiation Protocol (SIP) between the Transport Plane, the Control Plane, and the Application Plane of the IMS. The CSCF consists of a Proxy CSCF (P-CSCF), an Interrogating CSCF (I-CSCF), and a Serving CSCF (S-CSCF), each of which has its own function within the IMS.

The P-CSCF is the entry point to the IMS domain and it serves as a proxy server for mobile terminals. A mobile terminal attaches to the P-CSCF prior to performing IMS registration and initiating SIP sessions. The P-CSCF may be in the home domain of an IMS operator, or it may be in a visited domain, where a mobile terminal is currently roaming. In order to attach to a given P-CSCF, a mobile terminal performs P-CSCF discovery procedures.

Two different implementations of the invention will now be described. In a first implementation of an IMS, a P-CSCF, that is the first IMS network element (NE) which is involved in handling service provision, serves a single time zone, but the IMS itself serves several time zones, that is there are several P-CSCFs but each one of them serves a single time zone. In a second implementation, one P-CSCF serves more than one time zone.

Figure 1:
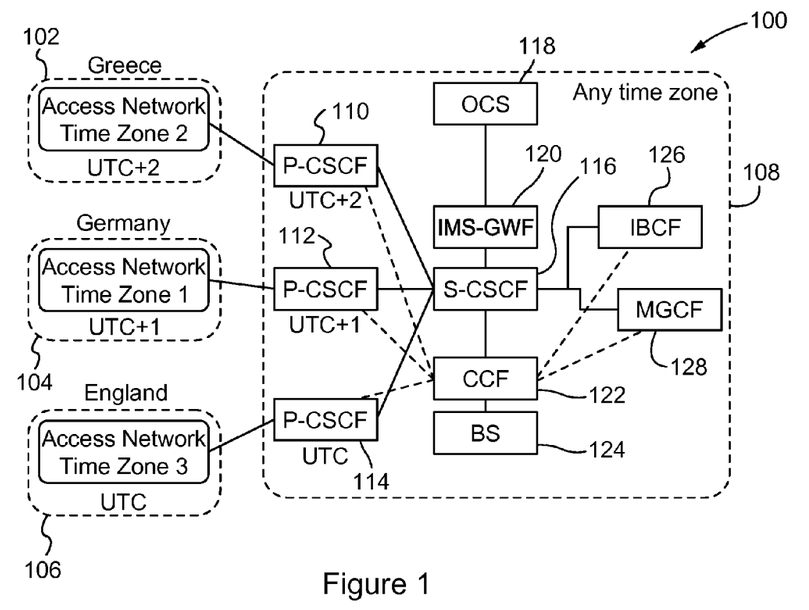
FIG. 1 shows a first implementation of the invention in which one P-CSCF serves a single time zone.

The first implementation of the invention is shown in FIG. 1. This shows an IMS-based system 100 comprising a number of access networks 102, 104, and 106 connected to an IMS core network 108. The IMS core network 108 serves the access networks 102, 104, and 106 in the provision of IMS-based services.

Each of the access networks has associated with it a Proxy-Call Session Control Function (P-CSCF), respectively 110, 112, and 114, acting as a proxy with respect to the IMS core network 108. The function of the P-CSCF is to act as a SIP proxy, that is the first point of contact for the IMS terminal. The IMS core network 108 comprises a Serving-Call Session Control Function (S-CSCF) 116, an Online Charging System (OCS) 118, an IMS Gateway Function (IMS-GWF) 120, a Charging Collection Function (CCF) 122, a Billing System (BS) 124, an Interconnect Border Control Function (IBCF) 126, and a Media Gateway Control Function (MGCF) 128.

It should be understood that a P-CSCF may be located in a visited network while an S-CSCF is part of a home IMS network. The visited network and the home network may have different, respective, network operators.

The S-CSCF 116 is a central node of the IMS core network. It acts as a registrar server and in some cases as a redirect server. It is the central point for IMS service control over the IP multimedia Subsystem Service Control (ISC) reference point. The S-CSCF 116 facilitates the routing path for IMS terminal originated- or IMS terminal terminated-IMS session requests. The S-CSCF 116 is connected to the BS 124 via the CCF 122 and to the OCS 118 via the IMS-GWF 120. The S-CSCF 116 is also connected to the IBCF 126 and the MGCF 128.

The OCS 118 handles online charging and the BS 124 handles offline charging. The IMS-GWF 120 is a SIP application server, whose role is to provide communication with the OCS 118. The IBCF 126 is used as a gateway to external networks, and provides Network Address Translation (NAT) and Firewall functions. The MGCF 128 communicates with the S-CSCF and controls connections for media channels in an IMS Media Gateway (IMS-MGW). It performs protocol conversion between ISDN User Part (ISUP) and the IMS call-control protocols.

In this embodiment, each access network 102, 104, and 106 and its associated P-CSCF 110, 112 and 114, is in a different time zone with respect to the other access networks/P-CSCFs. However, the invention is not restricted to communications systems in which different access networks are in different time zones but also to ones in which the access networks are in time zones which are, in effect, arbitrary with respect to each other.

In FIG. 1, each P-CSCF serves one time zone: a first P-CSCF 110 serves the access network 102 in a time zone 1, for example UTC+2, a second P-CSCF 112 serves the access network 104 in a time zone 2, for example UTC+1, and a third P-CSCF 114 serves the access network 106 in a time zone 3, for example UTC. UTC is Coordinated Universal Time.

When a service request is initiated by a user, an IMS terminal under the control of the user sends an initial service request to the IMS via the access network providing network access for the IMS terminal. The initial service request is conveyed by the access network to the relevant P-CSCF and from there to the S-CSCF 116. Assuming that the request is authorised by a Home Subscriber Server (HSS) and service provision commences, arrangements are made for charging. The following steps depend on whether the request relates to a service and subscription combination for which online or offline charging is to be applied. In the former case, the relevant IMS NE responsible for providing the service, whether the S-CSCF/IMS-GWF 116/120 or another IMS NE, furnishes charging information to the OCS 118 in order to perform credit control before the service is provided. In the latter case, the S-CSCF 116 or other IMS NE, provides a Charging Data Function (CDF) with an indication of a start time at which the service was initiated, and a stop time at which the service was terminated.

Therefore, it will be appreciated that the IMS core network 108 is in a time zone which may be the same time zone as the time zone of one or more of the access networks/P-CSCFs, or might be a different time zone. There is no specific relationship between the time zones of the access networks/P-CSCFs and the IMS core network 108. However, for the sake of simplicity, in the present embodiment, it will be assumed that the IMS core network time is the time zone UTC.

In this case, since a P-CSCF is serving just one time zone, then there is a 1:1 relationship between the P-CSCF and the time zone. However, since other IMS network elements (NEs) in the IMS core network 108, such as the S-CSCF 116, IMS-GWF 120 and the SIP application servers, are effectively in an arbitrary time zone with respect to the time zone of the P-CSCF, they are unaware of the correct time zone in which a user is located.

Having described an implementation in which respective P-CSCFs serve respective time zones, two variants of the invention will now be described of how charging-related time information can be managed. Of course, it will be understood that correct time information provided in a system or combination of systems extending over a number of time zones may be used other than for charging. It may be used for LI, as referred to in the foregoing.

In a first variant, the IMS NEs of the IMS core network 108 which can be involved in the provision of an IMS service include a mapping table containing a mapping between the addresses of each of the P-CSCFs linked to the IMS core network 108 and its corresponding time zone. That is, the mapping table, for each P-CSCF, associates an identifier of that P-CSCF together with a time offset indicating the time difference between the time zone of the P-CSCF and a central IMS core network time. This is referred to as time zone offset information in the following variants and implementations. It is the time difference, expressed in plus or minus units of time, or zero, between the time of the time zone in which the P-CSCF, or other relevant NE, is located, and the IMS core network time.

Since there is a 1:1 relationship between the P-CSCF and the served time zone, that is only one item of time zone offset information needs to be associated with each P-CSCF, the IMS NEs of the IMS core network 108 which can be involved in the provision of an IMS service are able to use the time zone offset information from the mapping table to derive the actually used time zone from the P-CSCF address. This is typically in a header of a SIP request (for example a SIP REGISTER request or a SIP INVITE request)).

In a refinement of the invention, the mapping table may also need to consider daylight saving time, if used in the corresponding time zone or country. This may require the mapping table to have additional information about the daylight saving time so that it is available in the IMS NEs, to correctly apply time adjustment.

A disadvantage of the first variant is that every IMS NE, which needs correct time zone information, has to include the mapping table. Accordingly, in a second variant of the invention, time zone offset information is configured to be present in each P-CSCF. The time zone offset information may be pre-configured manually in each P-CSCF.

In the second variant, when provision of a service is requested by an IMS terminal, it sends an initial SIP request, for example an INVITE message, to a P-CSCF which has been assigned to this user in a previously performed IMS registration. The initial SIP request has associated with it a P-header. This is an informational message (rather than a command) which is specifically intended merely to pass extra information to a receiving entity, that is to other IMS NEs. The P-CSCF generates a globally unique identifier called ICID (IMS Charging Identity) which identifies, for charging purposes, the session which is going to be established. The P-CSCF places the ICID in a particular type of P-header field, referred to as a P-Charging-Vector header field (used for exchanging charging specific information within the IMS, defined in TS 24.229), of the initial SIP request. The P-CSCF may also generate a time stamp.

The SIP message discussed here may be an initial SIP request as mentioned above. It may be a SIP REGISTER or a SIP INVITE message.

According to the invention, the P-CSCF places the pre-configured time zone offset information into a P-header field of an initial SIP request, a SIP REGISTER, or a SIP INVITE message, which in a preferred embodiment is the 3GPP-specific extensions to a P-Charging-Vector header field. The syntax of the P-Charging-Vector header field is defined in IETF RFC 3455 and additional coding rules for this header field are, in one embodiment of the invention:
a time stamp, userTimeStamp="userTimeStamp" EQUAL gen-value and/or
time zone offset information, userTimeZone="userTimeZone" EQUAL gen-value.
As an alternative a new P-header can be added for this purpose having the following syntax:
P-UserTimeZone="P-UserTimeZone" HCOLON userTimeZone *(SEMI userTimeStamp)
userTimeZone="userTimeZone" EQUAL gen-value
userTimeStamp="userTimeStamp" EQUAL gen-value
The P-UserTimeZone header assumes that there is a trust relationship between a home network and the visited network for the provision of the accurate user time zone in which the IMS terminal has requested a service.

It will be appreciated that if it is known that the IMS system is configured to run with respect to UTC, then if the time zone offset information is generated with respect to UTC, NEs in the IMS may generate a local time, for example of service initiation/termination, by using the time zone offset information without it being necessary to refer to a provided time stamp. Therefore, a time stamp might not be sent.

The P-CSCF then relays the SIP message including the P-header field or fields to an S-CSCF of the IMS core network which, as is discussed in the foregoing, may be in a different time zone. In this way, another NE can receive the time zone offset information and the time stamp (if sent) which then can be used by that NE, or an associated NE, for charging purposes or for other purposes requiring correct local time.

At this point, the S-CSCF acts as a signalling controller so that another IMS NE can provide the requested service and the SIP request will be provided to that IMS NE. The IMS NE providing the service, whether the S-CSCF or another NE, now has the time zone offset information. Accordingly, in handling service provision, the IMS NE is able to use the received time stamp, and to adjust it according to the time zone offset information to generate a time stamp which correctly reflects the current time of the IMS terminal in its time zone. Similarly, when service provision ends, assuming that the IMS NE generates a corresponding time stamp, it is able to refer to the IMS core network time, adjust it according to the time zone offset information, and generate another time stamp which correctly reflects the current time of the IMS terminal in its time zone.

If the service is of a type requiring online charging, the IMS NE sends a time stamp indicating the starting of service provision to the OCS before service provision starts and then a time stamp indicating the ending of service provision. If the service is of a type requiring offline charging, the IMS NE sends starting and ending time stamps to the CCF. As a consequence, irrespective of whether online or offline charging is being applied, the relevant billing system receives time-adjusted start and stop times in respect of the service which are correct for the IMS terminal in the relevant access network/time zone and an appropriate tariff can be used to determine the amount of charge incurred in the provision of the service.

In a preferred embodiment of the invention, time stamps provided have a format according to 3GPP TS 32.250/TS 32.298:
YYMMDDhhmmssShhmm
where:
YY=Year 00 to 99 BCD encoded
MM=Month 01 to 12 BCD encoded
DD=Day 01 to 31 BCD encoded
hh=hour 00 to 23 BCD encoded
mm=minute 00 to 59 BCD encoded
ss=second 00 to 59 BCD encoded
S=Sign 0="+", "−" ASCII encoded
hh=hour 00 to 23 BCD encoded
mm=minute 00 to 59 BCD encoded In the foregoing, it is described that a time stamp is generated in the P-CSCF. It will be understood that in some cases this time stamp may be generated in the P-CSCF, for example in the charging function of the P-CSCF, and in some cases it may be generated in any other NE (for example in its charging function) which receives the SIP request including the time zone offset information. Therefore, the invention can be applied to situations in which an initial time stamp associated with a request is generated in a P-CSCF (or corresponding entity) and a later time stamp is generated in another NE acting on the request, or both the initial and the later time stamps may be generated in a NE, other than the P-CSCF, acting on the request.

The "S" value, representing daylight saving time, may also be pre-configured in the P-CSCF. Since the "S" value is part of the time stamp format, it is provided, as part of the format, by the P-CSCF to other NEs in a suitable message.

It should be noted that the time stamp example given above is relevant to offline charging. For online charging, a corresponding and suitable time stamp may be generated in the P-CSCF and any other NEs.

For example, in a particular case, the local time of an IMS GWF may be expressed as 080910091244+01:00, time zone offset information included in the P-header may be +02:00, and this time zone offset may be used for applying a time zone correction to produce a correct local time for charging purposes.

The P-CSCF assigned to the user uses the P-header as a way to provide the time zone offset information to the IMS core network. This ensures that the correct time zone is known by the relevant IMS NEs, for example the IMS-GWF, which is involved in IMS online charging.

Figure 2:
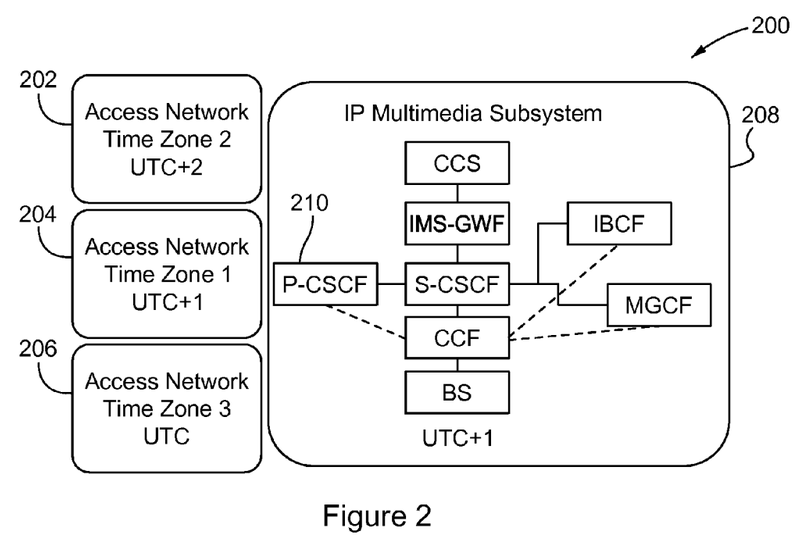
FIG. 2 shows a second implementation in which a single P-CSCF serves more than one time zone.

The second implementation of the invention is shown in FIG. 2. This shows an IMS-based system 200 comprising a number of access networks 202, 204, and 206 connected to an IMS core network 208. The access networks are served by one P-CSCF 210 acting as a proxy with respect to IMS core network. The IMS core network 208 comprises an S-CSCF, an OCS, an IMS-GWF, a CCF, a BS, an IBCF, and an MGCF.

In this case, the access networks may be located in different time zones and so time information of the P-CSCF, for example its local time, does not reflect the time zone in which an IMS terminal may be located. In order to deal with this, the relationship between the location of the user and the corresponding time zone in which the user is located is established in order to be provided to the IMS.

Thus, user-related time zone offset information is provided, in some form, from the relevant access network in which the IMS terminal is located to the IMS core network 208. As will be explained in the following, this does not have to be an explicit statement of the time zone offset information. The time zone may be related to the geographical location of the user.

Two variants of the second implementation will now be described, a first variant in which the invention is applied to IP based access networks and a second variant in which the invention is applied to TISPAN networks.

Referring to the first variant of the second implementation, the invention may also be applied to IP based access networks linked to an IMS core providing IMS services. These IP based access networks may be fixed access networks, xDSL networks, or WLAN connectivity via xDSL networks.

In an implementation of such a network, a relationship between a terminal, which may be a mobile terminal, and its corresponding time zone, that is the time zone of the access network, is established. This relationship can be provided by using the configuration of an entity within the network which is responsible for authentication and authorisation functions such as allocating an IP address to terminals. This may be an AAA server located in the access network.

It will be understood that this implementation of the invention has one P-CSCF serving a number of different access networks in respective time zones with each access network having its own AAA server. According to the invention, each AAA server is configured to allocate IP addresses to mobile terminals from within a specific, pre-defined, range of IP addresses. There are a number of such IP address ranges which are non-overlapping and assigned to respective ones of the AAA servers. Accordingly, for a particular time zone, it is possible to determine from a specific IP address the corresponding IP address range and therefore, the time zone in which a mobile terminal is located. To this end, the P-CSCF may be pre-configured with a mapping between IP address ranges and the relevant access network and/or respective time zone offset information for each access network.

It should be noted that the access networks, and the AAA servers, are independent of the IMS. However, operators of access networks are assigned an IP address range or IP address ranges which they are permitted to allocate to terminals. Accordingly, each terminal can be assigned a time zone specific IP address which can be examined to determine an identity of the access network providing that IP address and thus a determination of its time zone. However, it should be noted that it is not necessary within the IMS to map an IP address to a time zone offset via an access network identifier, and there may be direct mappings between IP addresses and time zone offsets.

Therefore, according to the invention, a terminal is allocated a specific IP address when it registers with the access network which may be mapped to a specific access network and/or to a specific time zone. Once in possession of the specific IP address, the terminal is able to provide it to the IMS when necessary.

In one embodiment of the invention, the terminal provides the specific IP address to the IMS in a SIP message. The manner in which the terminal provides the specific IP address depends on the nature of the transaction between the mobile terminal and the IMS. If the terminal is registering with the IMS, the specific IP address may be provided during this process. If the terminal makes a service-related request, then the specific IP address is provided according to the nature of the service. If the service is based on an IMS session, the specific IP address may be provided in a SIP INVITE message. If the service is not session-based, for example if it is simply in respect of an event, the time zone specific IP address is provided in any SIP message, such as NOTIFY, MESSAGE, REGISTER, REFER, SUBSCRIBE or PUBLISH.

The SIP REGISTER message can be used for a number of different purposes such registering to a third party application. It should be noted that charging does not necessarily mean billing and, therefore, by providing time information in the SIP REGISTER message, statistical information can be collected using the correct time zone offset information, etc.

Once the IMS has received the specific IP address, it can be used by any relevant IMS NE to adjust time stamps according to the location of the mobile terminal as will now be described.

A suitable message conveying the time zone specific IP address is received by the P-CSCF of the IMS. According to the invention, the P-CSCF may be configured with a mapping table containing the relationships or correspondences between ranges of IP addresses and time zone offsets relative to an identified time zone, for example offsets relative to UTC. On receipt of the time zone specific IP address, that is the message conveying it, the P-CSCF is able to refer to the mapping table and to generate, in respect of that message, the relevant time zone offset.

Once the time zone offset information has been obtained, the operation of the second variant of the first implementation may be followed. That is, the P-CSCF may relay a message, for example a request message, such as a SIP request, including a relevant P-header field containing the time zone offset information and another field containing a time stamp (if necessary) to an S-CSCF of the IMS core network which, as is discussed in the foregoing, may be in a different time zone. In this way, another NE can receive the time zone offset information and the time stamp which then can be used by that NE, or an associated NE, for charging purposes, or other purposes requiring the correct local time. Accordingly, a time stamp which is corrected for local time may be generated by the P-CSCF and/or any other NEs which receive the time zone offset information. However, it will be understood from the preceding description that it is not necessary in all cases for the time stamp to be sent together with the time zone offset information because a time stamp may be generated by an NE which receives the time zone offset information.

In this way, the P-CSCF is able to provide the time zone offset information to whichever of the IMS NEs are involved in providing the requested service to enable these NEs to generate the correct local time for any device making a service request.

Although is it possible that the P-CSCF can be in a different time zone to the other IMS NEs, this does not matter because all that is required is for correct time zone offset information to be provided in respect of the user, that is where the user is located/using the service.

In order to provide the correct time zone offset information to the other involved IMS NEs, the relevant SIP message may be modified so that it has a P-Charging-Vector according to the first implementation having a field specific for carrying time zone offset information, or alternatively a new P-header for this message may be defined.

In the case of an IMS terminal making service requests in its own IMS, the P-header including the correct time zone offset may be provided to all IMS network elements within the signalling path, but not to another IMS system or to another SIP based network. In other words, the P-header is kept in the network of the IMS terminal making the request, that is the network within which charging to be applied to the IMS terminal is carried out, and used in that network, but is not provided to a terminating network because it is not required there for charging purposes.

The invention is also able to handle a situation in which an IMS terminal is IMS roaming. That is, it is roaming in a foreign IMS network. In such a case, the IMS terminal uses the P-CSCF of the roaming IMS network. In this case, the P-header is provided by the visited IMS to the home IMS, since according to the current IMS charging architecture offline and online charging are applied in the home IMS only. In this case, the visited IMS/P-CSCF provides the correct time zone offset information to the home IMS network elements, such as the S-CSCF.

Referring now to the second variant of the second implementation, the invention may also be applied to TISPAN networks. TISPAN (Telecommunications and Internet converged Services and Protocols for Advanced Networking) is an architecture which incorporates IMS and is also capable of handling non-SIP applications. It is an IP based access network. The invention may be applied to fixed network environments.

In common with the first variant of the second implementation, in this variant, a TISPAN access network is linked to an IMS core providing IMS services.

Access to the access network is controlled by a Network Attachment Sub-System (NASS) which provides registration and initialisation of terminals, including carrying out authentication and assigning a network level identity (ID) to a mobile terminal. A Customer Network Gateway Configuration Function (CNGCF) is a sub-element of the NASS used during initialising and updating terminals, for example mobile terminals, to provide a number of parameters and information required for service provision. For example, a CNGCF may provide a terminal with configuration information such as configuration of a firewall internally in the terminal and QoSmarking of IP packets, and network configuration data. An IP address and network configuration data may be provided by a sub-element of the NASS called the Network Access Configuration Function (NACF). It will be understood that the CNGCF provides a function which is analogous to the P-CSCF in the embodiments described in the foregoing.

The IMS core is able to provide IMS services via different TISPAN access networks to which it is linked. According to the invention, it will be understood that each terminal is assigned a time zone specific IP address depending on the access node from which it received its IP address. This second variant of the invention works in a way corresponding to the preceding variant in which a mapping table containing IP address ranges, in this case in the CNGCF, is used to determine time zone offset information. In this way, if a TISPAN access network is used to provide IMS services, then, according to the invention, a relationship between an IMS terminal and its corresponding time zone may be established.

In such an operation, the CNGCF is able to derive the time zone offset information and can then provide this to whichever of the IMS network elements are involved in providing the requested service, to enable the NEs to generate the correct local time for a device making a service request via a TISPAN access network. The time zone offset information may be provided to the IMS as part of a SIP message. This may be done by adding the time zone offset information to any appropriate field of an IMS message, for example a request message. It may be added to an existing or to a new P-header, or to any suitable field. As stated in the foregoing, in terms of handling the time zone offset information, this variant operates in a way which is very similar to the way described in respect of the preceding variant.

Accordingly, during registration of a terminal with the IMS (but also with any other SIP request) the IP address assigned to the mobile terminal is provided to a relevant IMS NE.

Accordingly, the second variant is similar to the first variant in that in both IP address evaluation is done first to generate a time zone offset, time zone "correction" using the time zone offset is done by a IMS network element responsible for arranging a requested service (the IMS network element might actually carry out the service or might instruct another network element to carry it out), and time zone corrected time stamps are sent to a billing functionality or to an OCS functionality. The final correlation between IP address range and time zone is done in a billing domain or in an OCS for Online Charging. The term final correlation means the charging correlation, which has to be performed if charging information for one event or session is delivered by more than one IMS NE.

In the foregoing implementations and variants, the IMS NEs to which a P-CSCF or a CNGCG may provide a service request to may include a S-CSCF, an application server (AS), and a Media Resource Function Controller (MRFC). The MRFC is an IMS node providing a media resource broker function between an AS and media server resources in the IMS, and can be implemented as part of an AS or as a separate network element. It is responsible for Play Announcements and, therefore, correct local time enables suitable media content, such as audio, to be selected for sending for playing in a time appropriate context.

The invention deals with situations in which the access network linked to the IMS may be a mobile network, or another kind of network such as a fixed network. As a result, users are not fixed to particular geographical locations or access points and thus may seek access from different geographical locations and access points. The invention enables the provision of correct time information in these circumstances. It may be applied to access networks such as GPRS, UMTS, WLAN, xDSL, and Cable, from which IMS services are sought.

It should be understood that providing correct time information in a system or combination of systems extending over a number of time zones may be used for other circumstances than charging. It may be used for LI, as referred to in the foregoing.

While preferred embodiments of the invention have been shown and described, it will be understood that such embodiments are described by way of example only. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of handling time information in a communications system comprising:
   receiving a request message requesting a communication service at a proxy call session control function entity in a core network, the proxy call session control function entity being one of a plurality of proxy call session control function entities of the communications system that serve respective visited networks, the visited networks having respective time differences with respect to a core network time;
   including in the request message at the proxy call session control function entity a time zone offset between a local time and the core network time, the time zone offset being a time difference with respect to the core network time, expressed in plus or minus units of time, or zero, between the local time and the core network time; and
   providing the request message requesting the communication service including the time zone offset to a different network element in the core network to enable a time stamp to be generated in the core network adjusted to correspond to the local time.

2. A method according to claim 1 in which network elements of the core network comprise a mapping table containing a mapping between addresses of proxy call session control function entities linked to the core network and time zone offset information.

3. A method according to claim 2 in which the network elements are capable of using an address of a proxy call session control function entity and a corresponding time zone offset to derive local time of a terminal or a network element.

4. A method according to claim 1 in which the core network provides services via a plurality of access networks.

5. A method according to claim 4 in which a user-related time zone offset is provided from an access network, in which a terminal is located, to the core network.

6. A method according to claim 4 in which a relationship between a terminal and a corresponding time zone of the terminal is provided by an entity within a particular access network which is responsible for allocating an IP address to a terminal.

7. A method according to claim 1 in which the request message has a header into which the proxy call session control function entity places the time zone offset.

8. A method according to claim 1 in which the request message is provided by the proxy call session control function entity to a network element.

9. A method according to claim 8 in which the time zone offset is retrieved from a header by the network element and used by the network element, or by an associated network element, to generate a correct local time stamp.

10. A communications system capable of handling time information in a communications system comprising:
    a core network having a core network time;
    a proxy call session control function entity in the core network, the proxy call session control function entity comprising a hardware processor, the proxy call session control function entity configured to receive a request message requesting a communication service, the proxy call session control function entity being one of a plurality of proxy call session control function entities of the communications system that serve respective visited networks, the visited networks having respective time differences with respect to a core network time; and
    a network element in the core network,
    wherein the hardware processor of the proxy call session control function entity is configured to include in the request message a time zone offset between a local time and the core network time, the time zone offset being a time difference with respect to the core network time, expressed in plus or minus units of time, or zero, between the local time and the core network time, and configured to provide the request message requesting the communication service including the time zone offset to a network element in the core network, the network element being a different element to the proxy call session control function entity, the time zone offset being useable to generate a time stamp in the core network adjusted to correspond to the local time.

11. A proxy call session control function core network node for a communications system comprising a hardware processor configured to handle time information in the communications system, the node also being configured to receive a request message requesting a communication service via an input;
    wherein the node services a visited network, the visited network having a time difference with respect to a core network time, and is one of a plurality of proxy call session control function entities of the communications system that serve respective visited networks, the visited networks having respective time differences with respect to the core network time; and
    wherein the hardware processor of the node is configured to include in the request message a time zone offset between a local time and the core network time, the time zone offset being a time difference with respect to the core network time, expressed in plus or minus units of time, or zero, between the local time and the core network time, and configured to provide the request message requesting the communication service including the time zone offset to a different network element in a core network, the time zone offset being useable to generate a time stamp in the core network adjusted to correspond to the local time.

12. A computer program product, embodied on a non-transitory computer readable medium, comprising software code that when executed on a computing system performs a method of handling time information in a communications system, the method comprising the steps of:
    receiving a request message requesting a communication service at a proxy call session control function entity in a core network, the proxy call session control function entity being one of a plurality of proxy call session control function entities of the communications system that serve respective visited networks, the visited networks having respective time differences with respect to a core network time;

including into the request message at the proxy call session control function entity a time zone offset between a local time and the core network time, the time zone offset being a time difference with respect to the core network time, expressed in plus or minus units of time, or zero, between the local time and the core network time;

providing the request message requesting the communication service including the time zone offset to a different network element in the core network; and generating a time stamp in the core network adjusted to correspond to the local time.

* * * * *